US012631062B2

(12) United States Patent
Lee et al.

(10) Patent No.: US 12,631,062 B2
(45) Date of Patent: May 19, 2026

(54) HINGE ASSEMBLY FOR A WASHING MACHINE

(71) Applicant: SAMSUNG ELECTRONICS CO., LTD., Suwon-si (KR)

(72) Inventors: Jin Ho Lee, Suwon-si (KR); Hwa Shik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/900,151

(22) Filed: Sep. 27, 2024

(65) Prior Publication Data

US 2025/0020010 A1 Jan. 16, 2025

Related U.S. Application Data

(63) Continuation of application No. 17/661,484, filed on Apr. 29, 2022, now abandoned, which is a
(Continued)

(30) Foreign Application Priority Data

Jul. 22, 2015 (KR) ........................ 10-2015-0103626

(51) Int. Cl.
*E05D 3/12* (2006.01)
*D06F 34/20* (2020.01)
(Continued)

(52) U.S. Cl.
CPC ............... *E05D 3/12* (2013.01); *D06F 34/20* (2020.02); *D06F 39/14* (2013.01); *E05D 7/00* (2013.01);
(Continued)

(58) Field of Classification Search
CPC ... E05D 11/0081; E05D 3/12; E05D 11/0054; E06F 39/14; E05Y 2900/312
See application file for complete search history.

(56) References Cited

U.S. PATENT DOCUMENTS 3,042,471 A 7/1962 Haslup
3,883,201 A 5/1975 Busoni
(Continued)

FOREIGN PATENT DOCUMENTS

CN 201598481 U 10/2010
CN 106192302 A 12/2016
(Continued)

OTHER PUBLICATIONS

ISA/KR, International Search Report and Written Opinion of the International Search Authority, International Application No. PCT/KR2016/007673, Sep. 12, 2016, 21 pages.
(Continued)

*Primary Examiner* — Gregory J Strimbu

(57) ABSTRACT

A washing machine having a structure to electrically connect electronic parts inside a door of the washing machine to different electronic parts inside a cabinet of the washing machine. The washing machine includes: the cabinet which is equipped with a first electronic part therein, the cabinet having an opening to put in laundry; the door which is equipped with a second electronic part therein and is configured to open or close the opening of the cabinet; a hinge assembly configured to pivotally connect the door with the cabinet; and a wire configured to be inserted through the hinge assembly to electrically connect the electronic parts of the cabinet and the electronic parts of the door.

8 Claims, 13 Drawing Sheets

Related U.S. Application Data continuation of application No. 15/746,760, filed as application No. PCT/KR2016/007673 on Jul. 14, 2016, now abandoned.

(51) Int. Cl.

| | |
|---|---|
| ***D06F 39/14*** | (2006.01) |
| ***E05D 7/00*** | (2006.01) |
| ***E05D 11/00*** | (2006.01) |

(52) U.S. Cl.

CPC ..... *E05D 11/0081* (2013.01); *E05Y 2900/312* (2013.01)

(56) References Cited

U.S. PATENT DOCUMENTS

| | | | |
|---|---|---|---|
| 4,609,234 | A | 9/1986 | Naniwa et al. |
| 4,951,716 | A | 8/1990 | Tsunoda et al. |
| 5,787,724 | A | 8/1998 | Pohl et al. |
| 6,861,589 | B2 | 3/2005 | Katsumata et al. |
| 9,000,338 | B2 | 4/2015 | Kimura et al. |
| 10,294,712 | B2 | 5/2019 | Frantz et al. |
| 10,344,422 | B2 | 7/2019 | Kwon et al. |
| 10,450,691 | B2 | 10/2019 | Choi |
| 10,767,300 | B2 * | 9/2020 | Chun ...................... D06F 37/28 |
| 2005/0050926 | A1 | 3/2005 | Shaw et al. |
| 2007/0130730 | A1 | 6/2007 | Cho et al. |
| 2007/0220709 | A1 | 9/2007 | Hill |
| 2009/0193618 | A1 | 8/2009 | Hakamata et al. |
| 2015/0211167 | A1 | 7/2015 | Kim et al. |
| 2016/0201251 | A1 | 7/2016 | Zhang et al. |
| 2018/0038040 | A1 | 2/2018 | Kim et al. |
| 2018/0127911 | A1 | 5/2018 | Chen et al. |

FOREIGN PATENT DOCUMENTS

| | | | |
|---|---|---|---|
| CN | 107532365 | A | 1/2018 |
| DE | 2244751 | A | 3/1974 |
| EP | 1363375 | A1 | 11/2003 |
| EP | 2743393 | A1 | 6/2014 |
| EP | 3263757 | A1 | 1/2018 |
| EP | 3290566 | A1 | 3/2018 |
| KR | 20-1999-0013516 | U | 4/1999 |
| KR | 10-2009-0096948 | A | 9/2009 |
| KR | 10-2010-0087118 | A | 8/2010 |
| KR | 10-2015-0006264 | A | 1/2015 |
| KR | 10-2015-0051465 | A | 5/2015 |
| WO | 2005014913 | A1 | 2/2005 |

OTHER PUBLICATIONS

Extended European Search Report and European Search Opinion for European Patent Application No. 16827996.6 mailed Mar. 23, 2018; 9 pages.
Office Action in connection with Chinese Application No. 201680042532.9 dated Nov. 26, 2019, 20 pages.
The Second Office Action in connection with Chinese Application No. 201680042532.9 dated Jul. 13, 2020, 13 pages.
European Search Report in connection with European Application No. 21171936.4 issued Jun. 2, 2021, 9 pages.
Notice of Preliminary Rejection dated Sep. 8, 2021, in connection with Korean Patent Application No. 10-2015-0103626, 12 pages.
Communication pursuant to Article 94(3) EPC dated Apr. 13, 2022, in connection with European Application No. 21171936.4, 5 pages.
Non-final Office Action dated Aug. 3, 2022, in connection with U.S. Appl. No. 15/746,760, 15 pages.
Communication pursuant to Article 94(3) EPC dated Jan. 23, 2024, in connection with European Application No. 21171936.4, 6 pages.
Notice of Patent Allowance dated Dec. 7, 2023, in connection with Korean Application No. 10-2023-0066022, 3 pages.
Communication under Rule 71(3) EPC dated May 2, 2025, in connection with European Application No. 21171936.4, 49 pages.

* cited by examiner

HINGE ASSEMBLY FOR A WASHING MACHINE

CROSS-REFERENCE TO RELATED APPLICATIONS

The present application is a continuation of application Ser. No. 17/661,484, filed Apr. 29, 2022, which is a continuation of application Ser. No. 17/661,484 filed Apr. 29, 2022, which is a continuation of application Ser. No. 15/746,760, filed Jan. 22, 2018, which is the 371 National Stage of International Application No. PCT/KR2016/007673, filed Jul. 14, 2016, which claims the benefit of Korean Patent Application No. 10-2015-0103626, filed Jul. 22, 2015, the disclosures of which are fully incorporated herein by reference into the present disclosure as if fully set forth herein.

BACKGROUND

1. Field

The present disclosure relates to a washing machine, and more particularly, to a washing machine having an improved structure to electrically connect electronic parts inside the door to electronic parts inside the cabinet.

2. Description of Related Art

Washing machines are devices for washing laundry by rotating its cylindrical rotating tub that contains the laundry and water. As for types of the washing machine, there are drum washers in which a rotating tub is horizontally located and laundry is washed by being raised and falling along the inner wall of the rotating tub while the rotating tub is rotated clockwise/counterclockwise around the horizontal axis, and vertical axis washers in which a rotating tub having a pulsator therein is vertically located and laundry is washed using water currents produced by the pulsator while the rotating tub is rotated clockwise/counterclockwise along the vertical axis.

The drum washer includes a cabinet that constitutes the exterior, a cylindrical tub installed inside the cabinet for containing laundry water, a drum rotationally installed in the tub for washing laundry, a driving motor arranged in the back of the tube for turning the drum, and a door installed on the front of the cabinet. The cabinet has an opening linked to the drum, and the door may open or close the opening.

In general, electric parts are placed inside the cabinet. Therefore, in the process of electrically connecting the electronic parts placed inside the cabinet, wires are rarely exposed to the outside. However, as designs of the washing machine changes, the electronic parts placed inside the cabinet and the electronic parts placed outside the cabinet sometimes have to be connected by wires.

SUMMARY

An aspect of the present disclosure provides a washing machine having an improved structure to connect electronic parts in the door and electronic parts in the cabinet using wires without harming the aesthetic appearance of the washing machine.

Another aspect of the present disclosure provides a washing machine having an improved structure to electrically connect electronic parts in the door and electronic parts in the cabinet using wires passing a hinge assembly.

In accordance with one aspect of the present disclosure, a washing machine may include a cabinet equipped with a first electronic part therein and having an opening to put in laundry, a door equipped with a second electronic part therein and configured to open or close the opening, a hinge assembly configured to pivotally combine the door with the cabinet and a wire configured to pass the hinge assembly to electrically connect the first electronic part and the second electronic part.

The wire may be configured to penetrate the hinge assembly to connect the first electronic part and the second electronic part.

The door may further include a back plane facing the opening and having a through hole, and one end of the wire is connected to the second electronic part and the other end of the wire is connected to the first electronic part after passing the through hole and the hinge assembly.

The hinge assembly may include a first bracket coupled to the cabinet, a second bracket coupled to the door and a link unit configured to pivotally connect the first bracket and the second bracket. The wire may be configured to pass through the link unit to connect the first electronic part and the second electronic part.

The link unit may include a wire guide recessed along a side of the link unit for the wire to be inserted thereto.

The link unit may further include a link unit cover detachably coupled to the wire guide to prevent foreign materials from being brought into the wire guide.

The link unit cover may have a recessed part formed on one side, and the recessed part is configured to form a wire receiver to receive the wire with the wire guide once the link unit cover is coupled to the wire guide.

The door may further include a back plane facing the opening and having a through hole. The link unit may further include a wire inlet located adjacent to the second bracket for the wire to be inserted to the wire guide after passing the through hole.

The link unit cover may be coupled to the wire guide such that a portion of the wire guide adjacent to the second bracket is opened. The wire inlet may be formed in the opened portion of the wire guide.

The link unit may further include a wire outlet formed on a side of the link unit cover adjacent to the first bracket and provided to pull out the wire inserted to the wire guide.

In accordance with one aspect of the present disclosure, the washing machine may further include a protective member coupled to at least one of the wire inlet and the wire outlet while enclosing the wire to prevent snapping of the wire.

The protective member may have an elastic material.

The door may have a laundry inlet formed thereon to communicate with the opening. In accordance with one aspect of the present disclosure, the washing machine may further include a secondary door installed to open or close the laundry inlet.

The second electronic part may include at least one of an open/close detection sensor configured to detect whether the secondary door is opened or closed and a door lock switch configured to control whether to lock the secondary door.

The hinge assembly may include a first shaft configured to connect the first bracket and an end of the link unit and a second shaft configured to connect the second bracket and another end of the link unit.

In accordance with another aspect of the present disclosure, a washing machine may include a cabinet forming the exterior and having an opening to put in laundry, a door provided to open or close the opening, a hinge assembly configured to pivotally combine the door to the cabinet, a secondary door provided to open or close a laundry inlet formed in a portion of the door to throw laundry into the cabinet while the opening is closed by the door, a door lock switch configured to control whether to lock the secondary door, and a wire electrically connected to the door lock switch. The hinge assembly may include a link unit coupled to a first shaft and a second shaft at either end, and the wire may be arranged along at least a portion of the link unit.

The wire may be arranged between the first shaft and the second shaft.

In accordance with another aspect of the present disclosure, the washing machine may further include a wire guide formed in the link unit such that the wire may be arranged along a portion of the link unit.

The hinge assembly may include a first bracket coupled to one end of the link unit by the first shaft and a second bracket coupled to the other end of the link unit by the second shaft, and the first and second brackets may be coupled to the cabinet and the door, respectively.

In accordance with another aspect of the present disclosure, the washing machine may further include a link unit cover detachably coupled to the link unit such that the wire is arranged between the link unit cover and the link unit.

In the process of connecting electronic parts in the door and electronic parts in the cabinet by wires, significant exposure of the wires to the outside may be prevented by making the wires pass through a hinge assembly.

The wire may pass the hinge assembly in a convenient and easy manner by inserting the wires to a wire guide formed in a link unit.

Combining a link unit cover with the wire guide may prevent foreign materials from being brought into the wire guide.

Using the link unit cover to be detachably combined with the wire guide may perform the work of inserting the wire to the wire guide with the link unit cover removed, thereby improving the working efficiency, and may combine the link unit cover with the wire guide once the wire is inserted to the wire guide, thereby allowing the wire to be stably received in the wire receiving space.

DETAILED DESCRIPTION

Figure 1:
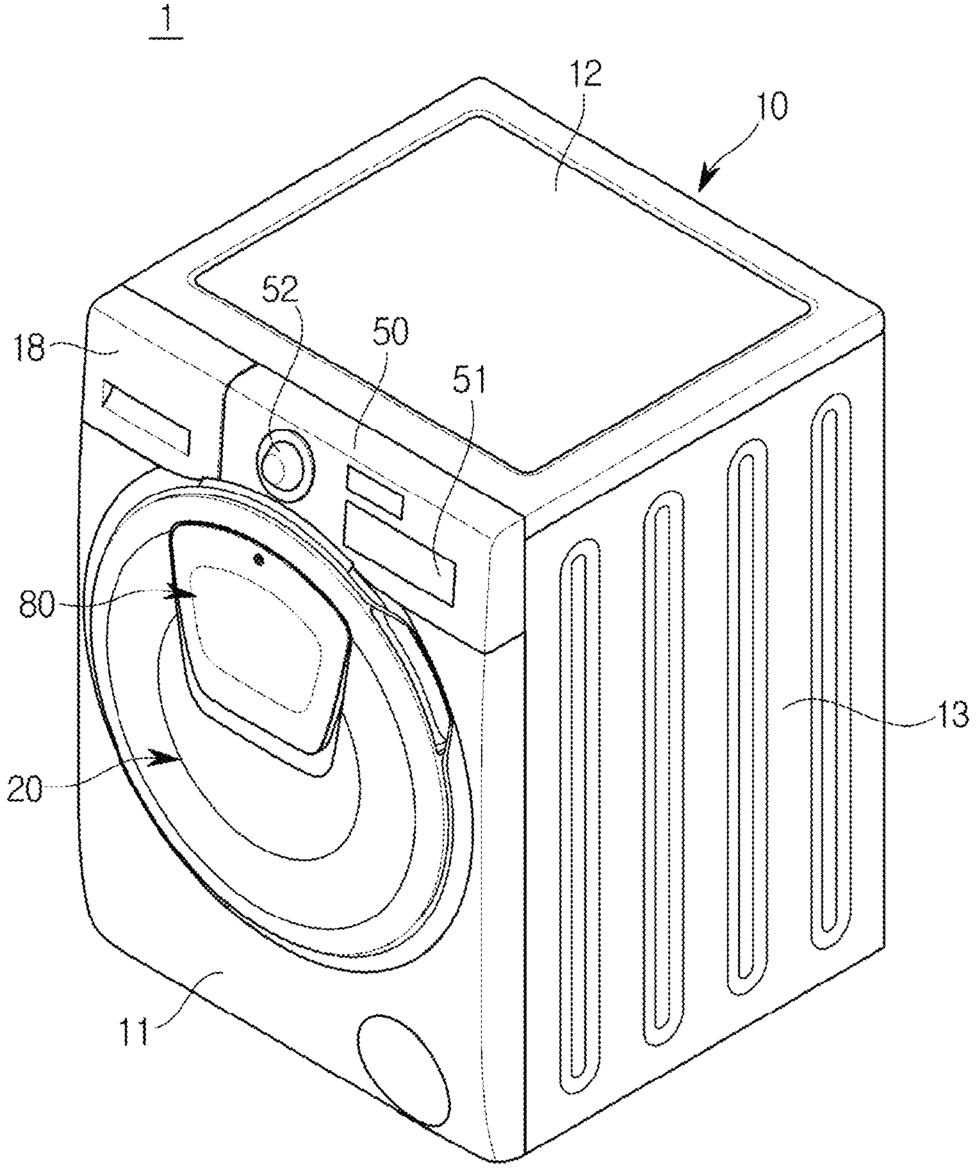
FIG. 1 is a perspective view of the exterior of a washing machine, according to an embodiment of the present disclosure.

Reference will now be made in detail to embodiments, examples of which are illustrated in the accompanying drawings, wherein like reference numerals refer to the like elements throughout. The terms “front”, “rear”, “upper”, “lower”, “top”, and “bottom” as herein used are defined with respect to the drawings, but the terms may not restrict the shape and position of the respective components.

Figure 2:
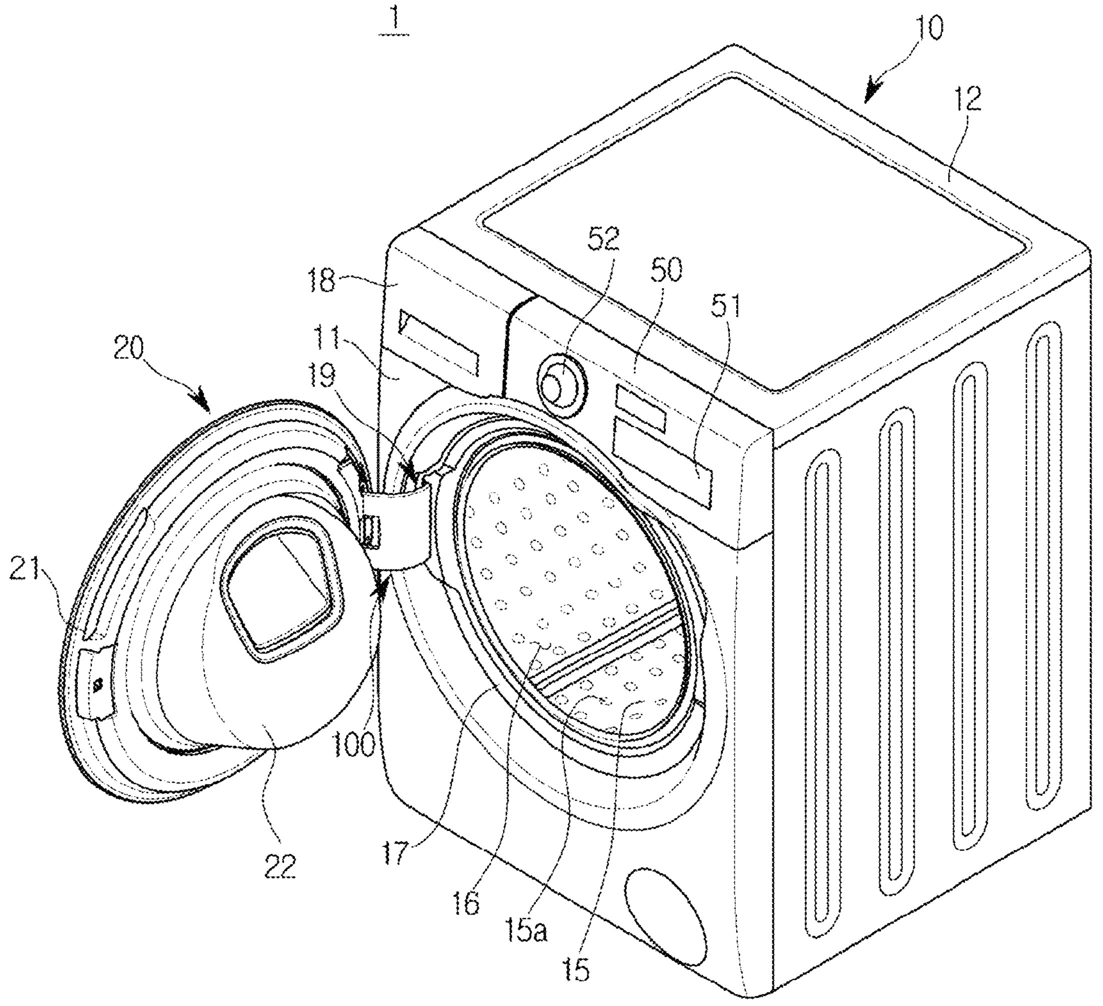
FIG. 2 is a perspective view of a washing machine with the door open, according to an embodiment of the present disclosure.
Figure 3:
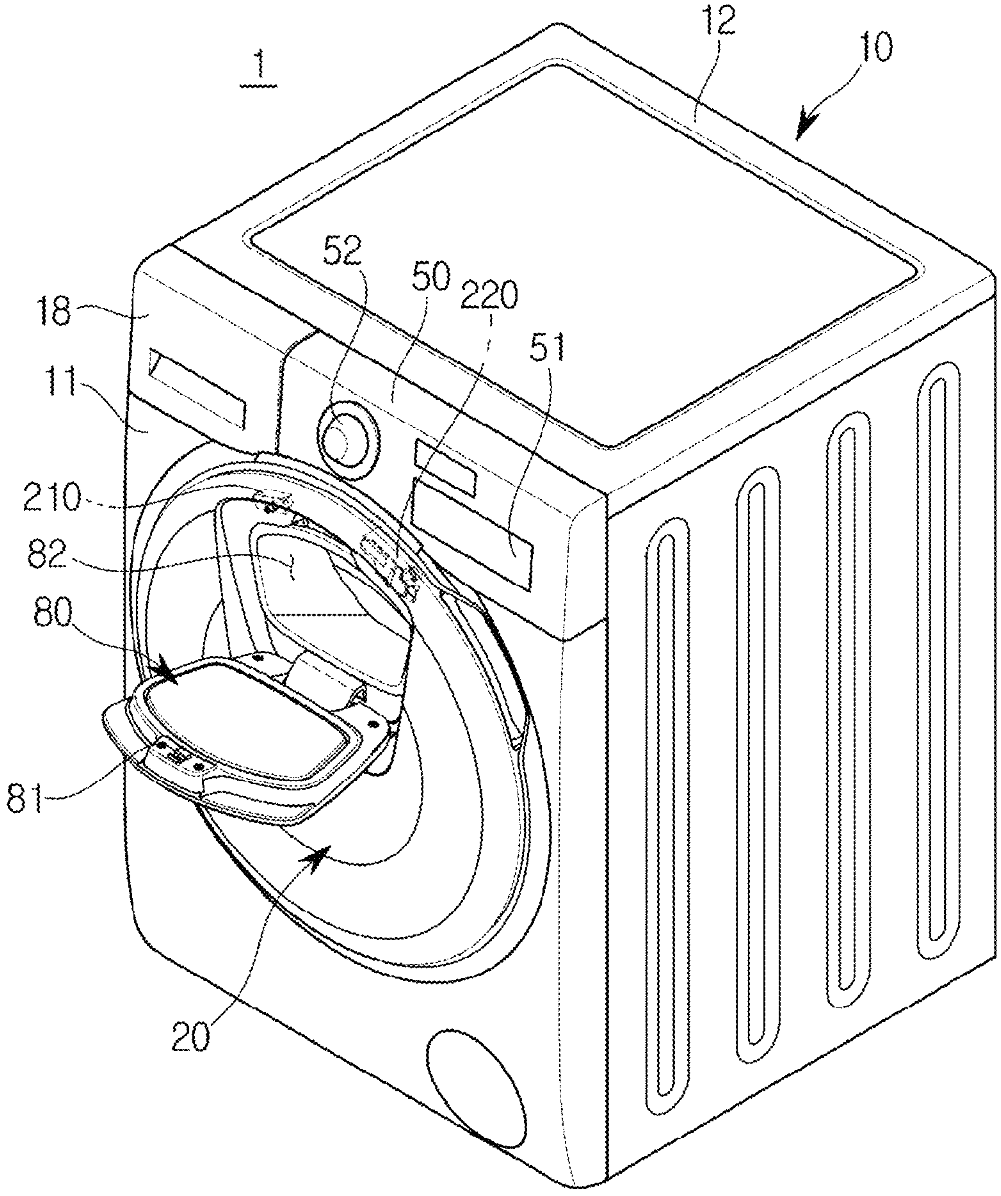
FIG. 3 is a perspective view of a washing machine with a secondary door open, according to an embodiment of the present disclosure.

FIG. 1 is a perspective view of the exterior of a washing machine, according to an embodiment of the present disclosure, and FIG. 2 is a perspective view of a washing machine with the door open, according to an embodiment of the present disclosure. FIG. 3 is a perspective view of a washing machine with a secondary door open, according to an embodiment of the present disclosure. Hereinafter, the term coupling member may be used to encompass a hinge assembly 100. That is, the coupling member is any element that combines a door 20 with a cabinet 10 and is not limited to the hinge assembly 100. In this regard, a wire 300 may pass the coupling member to electrically connect a first electronic part and a second electronic part.

The electronic parts refer to electric and electronic parts that work with power supplied thereto. Furthermore, the electronic parts may also mean to include a power supply device. The electronic parts may include the first and second electronic parts, which will be described in detail later.

As shown in FIGS. 1 to 3, a washing machine 1 may include the cabinet 10 that forms the exterior of the washing machine 1. The cabinet 10 may include a front frame 11 forming the front exterior of the washing machine 1, a top frame 12 forming the top exterior of the washing machine 1, side frames 13 forming the side exterior of the washing machine, a bottom frame (not shown) forming the bottom exterior of the washing machine, and a rear frame (not shown) forming the rear exterior of the washing machine.

The washing machine 1 may further include a tub (not shown). The tub may be installed inside the cabinet 10 to store laundry water.

The washing machine 1 may further include a drum 15. The drum 15 may be rotationally installed inside the tub. There may be many dehydration balls **15*a* formed on the wall of the drum 15. The drum 15 may be shaped like a cylinder. An opening may be formed on the front side of the drum 15** for entrance and exit of laundry.

The washing machine 1 may further include the door 20. An opening 16 may be formed on the front frame 11 to put in or pull out the laundry. The door 20 may be provided to open or close the opening 16. Specifically, the door 20 may be pivotally installed on the front frame 11 of the cabinet 10 to open or close the opening 16.

The front frame 11 of the cabinet 10 may be equipped with a door contact 17 to come into contact with the door 20 when the door 20 shuts the opening 16. The door contact 17 may be concavely formed toward the inner side of the washing machine 1 along the border of the opening 16.

Furthermore, the door contact 17 may be formed to correspond to the shape of the door 20. Accordingly, when the door 20 is shut, the aesthetic appearance may be improved by minimizing protruding parts from the surface of the cabinet 10.

A hinge assembly installation part 19 may be provided on a side of the door contact 17 for installing the hinge assembly 100 which will be described later.

The washing machine 1 may further include a water supply tube (not shown) and a detergent container 18. The water supply tube may be installed above the tub to supply laundry water into the tub. One end of the water supply tube may be connected to a water supply valve (not shown) and the other end of the water supply tube may be connected to the detergent container 18.

The detergent container 18 is connected to the drum 15 through a connecting tube (not shown), and the water supplied through the water supply tube is supplied into the drum 15 together with the detergent by passing through the detergent container 18.

The washing machine 1 may further include a driving motor (not shown). The driving motor may be provided in the back of the drum 15 to drive the drum 15.

The washing machine 1 may further include a drain unit (not shown). The drain unit may be placed in a lower portion of the cabinet 10 to drain the laundry water out of the washing machine 1. The drain unit may include a drain pump (not shown), a connecting hose (not shown) to connect the tub and the drain pump for the water inside the tub to flow into the drain pump, and a drain hose (not shown) to guide the water pumped by the drain pump to the outside of the washing machine 1.

The washing machine 1 may further include a control panel 50. The control panel 50 may be arranged in an upper portion of the front frame 11 of the cabinet 10. The control panel 50 may include a display window 51 to display an operating condition of the washing machine 1 and an operator 52 provided for the user to control the operating condition of the washing machine 1.

The door 20 may include a door frame 21 and a door glass 22. The door frame 21 may be provided to form the exterior of the door 20. The door glass 22 may be combined with the back of the door frame 21 to be inserted to the inner side of the opening 16 of the cabinet 10. The door glass 22 may be formed for the user to look into the drum 15 to check the laundry course with his/her naked eyes. It is preferable that the door glass 22 has a form that protrudes toward the back of the cabinet 10.

The washing machine 1 may further include the hinge assembly 100. The hinge assembly 100 may combine the door 20 and the cabinet 10. In other words, the hinge assembly 100 may enable the door 20 to be pivotally combined with the cabinet 10. The hinge assembly 100 will be described in more detail later.

The washing machine 1 may further include a secondary door 80. The secondary door 80 may be opened and shut separately from the door 20. Specifically, the secondary door 80 may be pivotally installed on the door 20 to be opened and shut separately from the door 20. The user may use the secondary door 80 to freely open or close part of the opening 16. In other words, a laundry inlet 82 may be formed in the door 20 to put in the laundry. The laundry inlet 82 may be formed to communicate with the opening 16. The laundry inlet 82 may be formed in a portion of the door 20 to put the laundry into the cabinet 10 while the opening 16 is shut by the door 20. The secondary door 80 may be provided to open or close the laundry inlet 82. Specifically, the secondary door 80 may be pivotally installed on the front of the door 20 to open or close the laundry inlet 82.

A side of the secondary door 80 may be hinged with the door 20. If the left or right side of the secondary door 80 is hinged with the door 20, the secondary door 80 may be opened and shut to the left or right. If the top or bottom side of the secondary door 80 is hinged with the door 20, the secondary door 80 may be opened and shut upwards or downwards. Preferably, the bottom side of the secondary door 80 may be hinged with the door 20 to open or close the secondary door 80 downwards.

A locking part 81 may be formed on the other side of the secondary door 80. The locking part 81 of the secondary door 80 may be detachably inserted to a fixing hole (not shown) formed in the door 20. Specifically, when the locking part 81 of the secondary door 80 is inserted to the fixing hole of the door 20, the secondary door 80 remains shut, and when the locking part 81 of the secondary door 80 is separated from the fixing hole of the door 20, the secondary door 80 remains opened.

The washing machine 1 may further include a first electronic part (not shown) included in the cabinet 10.

The washing machine 1 may further include a second electronic part provided outside the cabinet 10. For example, as for the locations where the second electronic part is placed, the second electronic part may be equipped in the door 20. The second electronic part may include at least one of an open/close detection sensor 210 for detecting whether the secondary door 80 is opened or shut and a door lock switch 220 for controlling whether to lock the secondary door 80. The types of the second electronic part are not, however, limited to what is related to opening or closing operations of the secondary door 80.

Figure 5A:
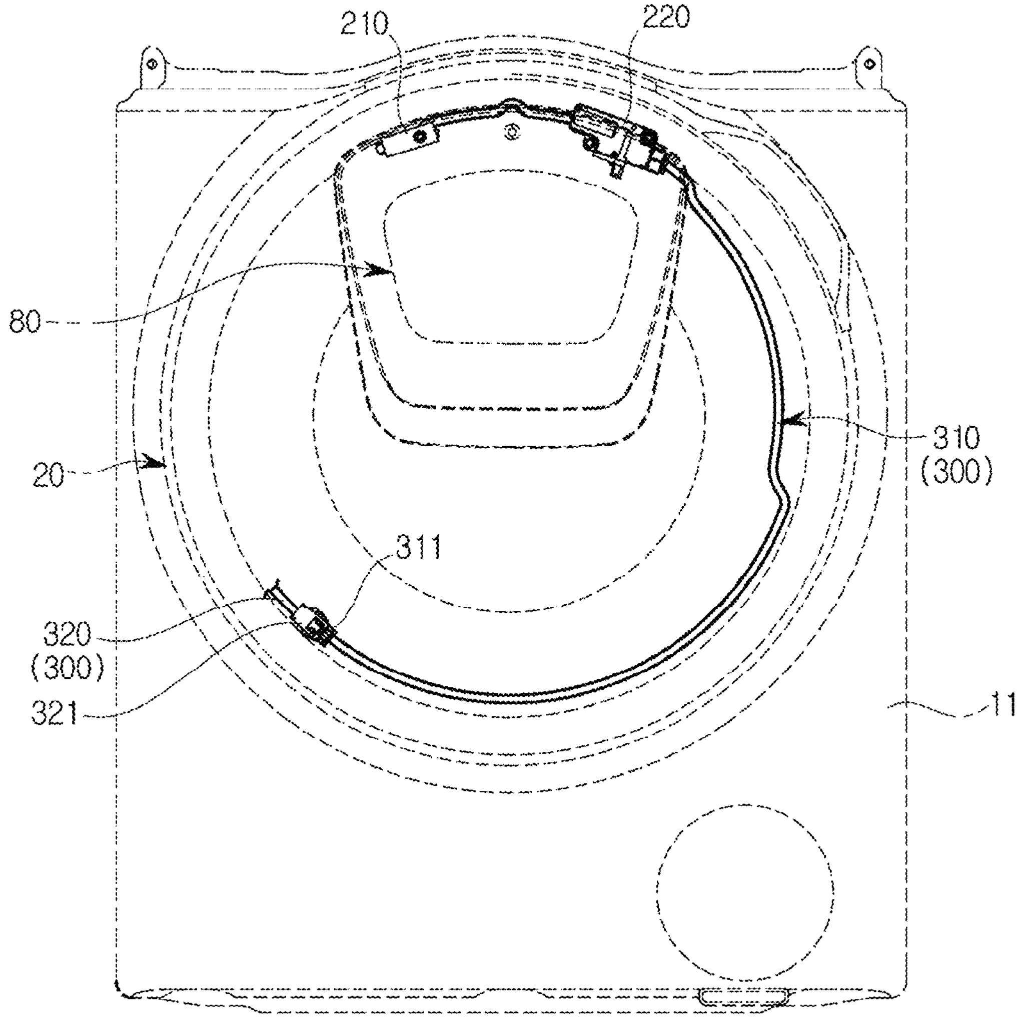
FIG. 5A schematically shows a state of wire connection in a washing machine viewed from the front of the front frame, according to an embodiment of the present disclosure.

The washing machine 1 may further include a wire 300 for connecting the first and second electronic parts (see FIG. 5A). The wire 300 may electrically connect the first and second electronic parts. The wire 300 will be described in more detail later.

Figure 4:
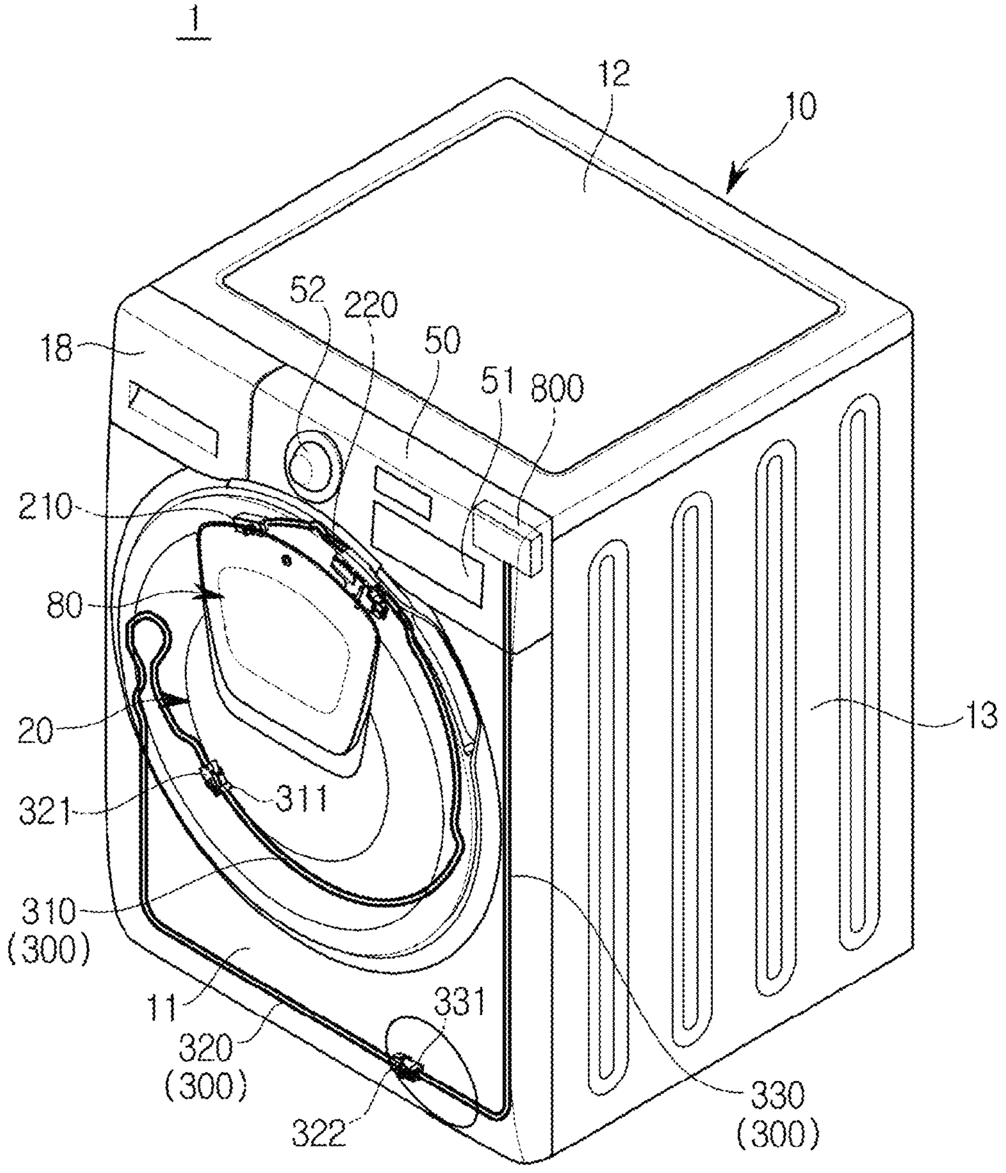
FIG. 4 schematically shows a state of wire connection in a washing machine, according to an embodiment of the present disclosure.

FIG. 4 schematically shows a state of wire connection in a washing machine, according to an embodiment of the present disclosure. To help understanding of the present disclosure, the wire 300 placed inside the washing machine 1 is shown in a solid line in FIG. 4.

As shown in FIG. 4, the wire 300 may electrically connect the first and second electronic parts.

The first electronic part may include, for example, a main printed circuit board (main PCB) 800, a sub PCB (not shown), a water supply valve (not shown), a driving motor (not shown), a power supply device (not shown), etc. The main PCB 800 may be placed inside the control panel 50. The main PCB 800 may control operating conditions of a microcomputer, the water supply valve, the driving motor, etc. Furthermore, the main PCB 800 may control operating conditions of the second electronic part. The sub PCB may be placed with the main PCB 800 inside the control panel 50. The sub PCB may control operating conditions of the display window 51, the operator 52, etc., arranged on the control panel 50. The main PCB 800 and the sub PCB are located anywhere inside the cabinet 10 and are not exclusively located inside the control panel 50. As an example of the first electronic part, the main PCB 800 will be focused in the following description.

As described above, the second electronic part may include at least one of the open/close detection sensor 210 for detecting whether the secondary door 80 is opened or shut and the door lock switch 220 for controlling whether to lock the secondary door 80. The types of the second electronic parts are not, however, limited to what is related to opening or closing operations of the secondary door 80. As an example of the second electronic part, the open/close detection sensor 210 and the door lock switch 220 of the secondary door 80 will be focused in the following description. Operating conditions of the open/close detection sensor 210 and the door lock switch 220 may be controlled by the main PCB 800.

The wire 300 may include a first wire 310, a second wire 320, and a main wire harness 330. The first wire 310 may connect the open/close detection sensor 210 and the door lock switch 220, which are arranged in the door 20. The first wire 310 may be connected to the second wire 320. Specifically, the first wire 310 and the second wire 320 may be electrically connected by combination of a connector 311 formed at one end of the first wire 310 and a first connector 321 formed at one end of the second wire 320. The combination of the connector 311 of the first wire 310 and the first connector 321 of the second wire 320 may be made in the door 20. The second wire 320 connected to the first wire 310 may be brought into the cabinet 10 after passing or passing through the hinge assembly 100. The second wire 320 brought into the cabinet 10 may be arranged along the lower edge of the cabinet 10. A second connector 322 formed at the other end of the second wire 320 is combined with a connector 331 of the main wire harness 330 located along an edge of the cabinet 10. The main wire harness 330 is connected to the main PCB 800 placed inside the control panel 50. In other words, the first wire 310, the second wire 320, and the main wire harness 330 may electrically connect the open/close detection sensor 210, the door lock switch 220, and the main PCB 800. The case where the main wire harness 330 is connected to the main PCB 800 was focused in the above description, but the main wire harness 330 may be connected to at least one of the first electronic parts.

Figure 5B:
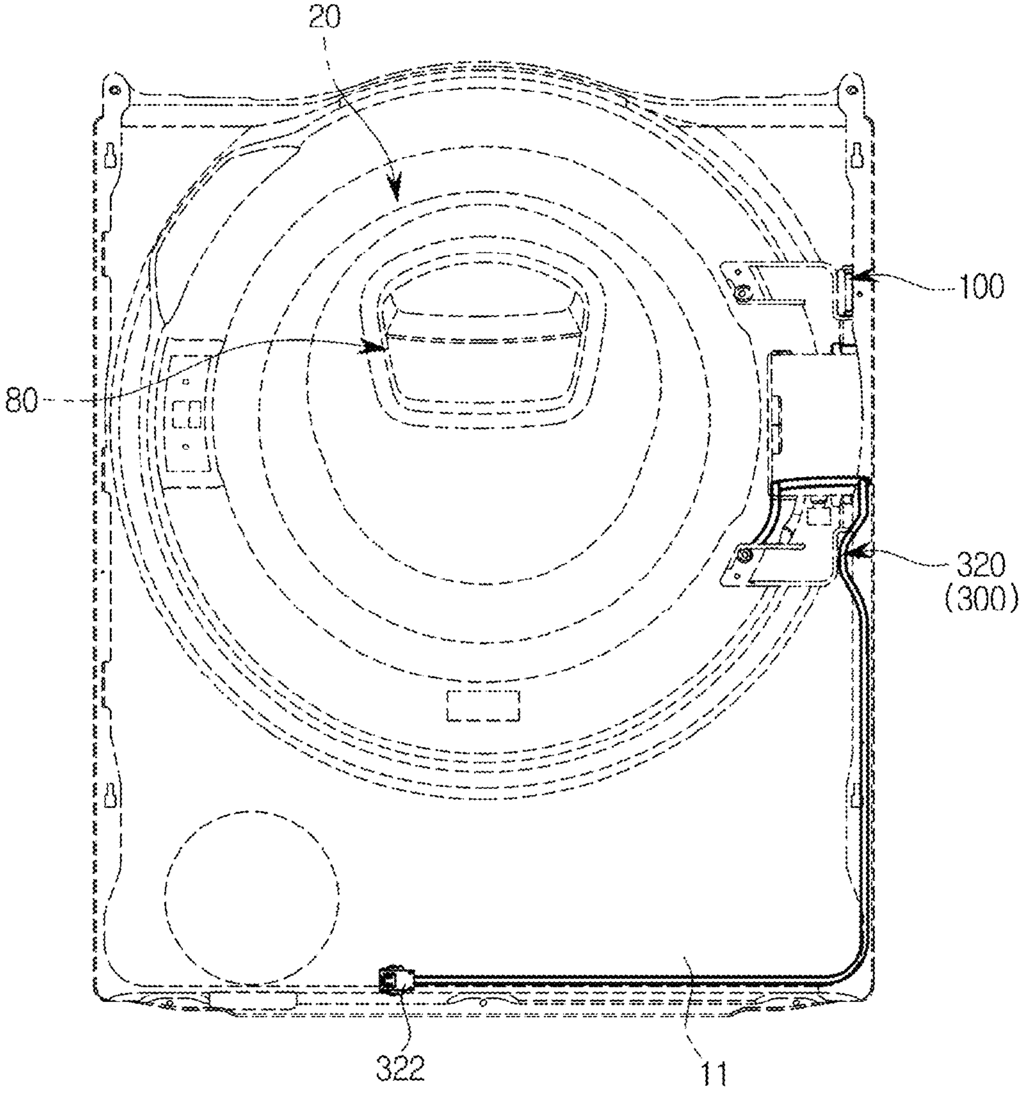
FIG. 5B schematically shows a state of wire connection in a washing machine viewed from the back of the front frame, according to an embodiment of the present disclosure.

FIG. 5A schematically shows a state of wire connection in a washing machine viewed from the front of the front frame, according to an embodiment of the present disclosure, and FIG. 5B schematically shows a state of wire connection in a washing machine viewed from the back of the front frame, according to an embodiment of the present disclosure. Specifically, FIG. 5A shows the front of the front frame 11 with the door 20 and the secondary door 80 shut, and FIG. 5B shows the back of the front frame 11 with the door 20 and the secondary door 80 shut. FIG. 5A is an example of the second electronic part equipped in the door 20, illustrating the open/close detection sensor 210 of the secondary door 80 and the door lock switch 220 of the secondary door 80.

As shown in FIGS. 5A and 5B, the wire 300 may connect the first and second electronic parts. Specifically, the wire 300 may pass the hinge assembly 100 to connect the first and second electronic parts. In other words, the wire 300 may penetrate the hinge assembly 100 to connect the first and second electronic parts.

In the process of connecting the first and second electronic parts, at least a part of the wire 300 may be arranged along the circumferential direction of the door 20. For example, at least a part of the wire 300 placed in the door 20 may be arranged along the circumferential direction of the door 20.

Furthermore, the wire 300 may be arranged between a first shaft 140 (see FIG. 7) and a second shaft 150 (see FIG. 7) in the process of passing the hinge assembly 100.

The second electronic part may be placed in the door 20. Specifically, the second electronic part may be provided in the door frame 21. For example, the second electronic part may be equipped in the door 20 to be adjacent to the fixing hole of the door 20 into which the locking part 81 of the secondary door 80 is inserted. The open/close detection sensor 210 and the door lock switch 220 may be arranged in the door frame 21 to face each other with the fixing hole between them. The open/close detection sensor 210 and the door lock switch 220 may be placed on an inner side of the door frame 21 corresponding to one side of the secondary door 80 facing the other side of the secondary door 80 hinged with the door 20. For example, in a case that the bottom side of the secondary door 80 is hinged with the door 20, the open/close detection sensor 210 and the door lock switch 220 may be placed on an inner side of the door frame 21 corresponding to the top side of the secondary door 80.

Figure 11:
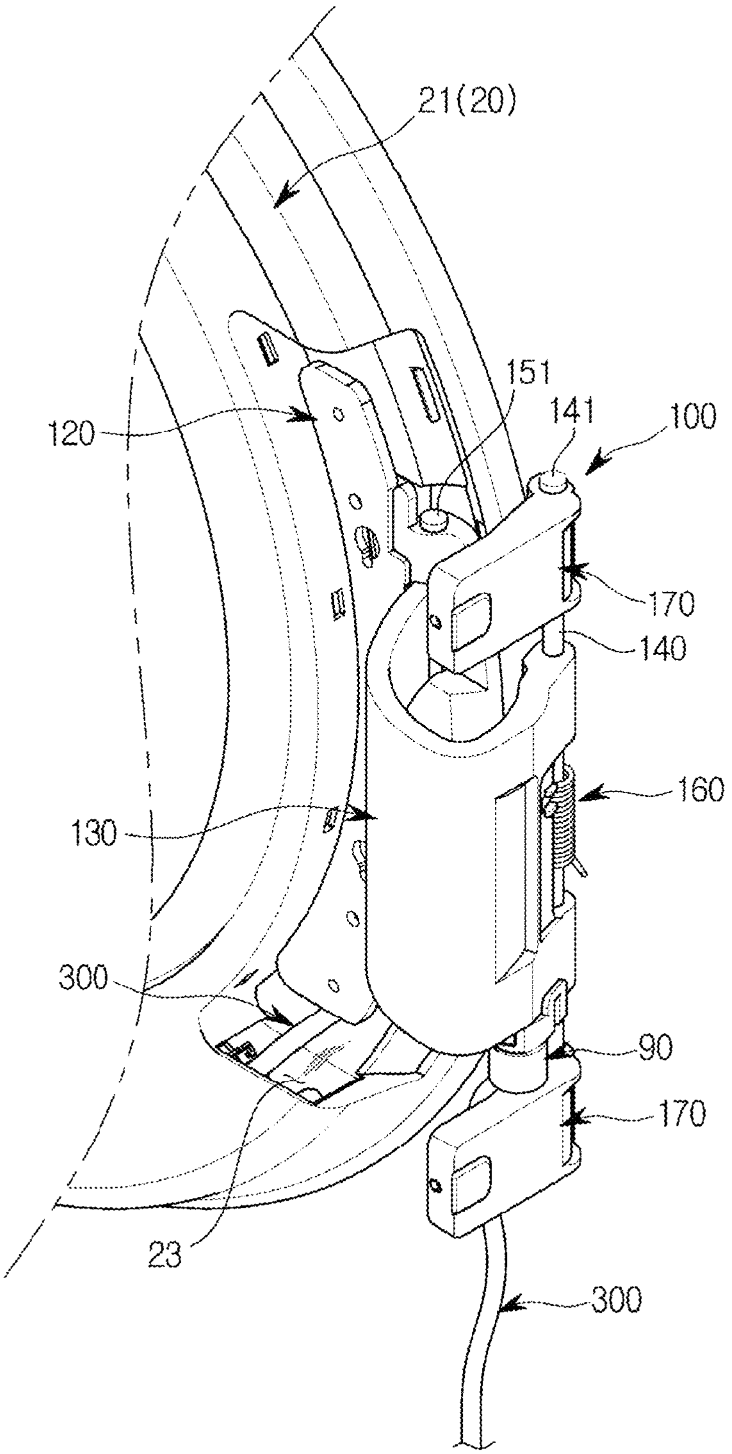
FIG. 11 shows wires passing a through hole of the door of a washing machine, according to an embodiment of the present disclosure.

The door 20 may further include a through hole 23 (see FIG. 11). The through hole 23 may be formed on the back of the door 20 facing the opening 16. In other words, the through hole 23 may be formed on the back of the door frame 21 facing the opening 16.

The wire 300 connected to the open/close detection sensor 210 and the door lock switch 220 passes the through hole 23 to reach the hinge assembly 100, and the wire 300 that reaches the hinge assembly 100 passes the hinge assembly 100 to be connected to the first electronic part equipped in the cabinet 10. In other words, one end of the wire 300 may be connected to the open/close detection sensor 210 and the door lock switch 220 and the other end of the wire 300 may pass the through hole 23 to the hinge assembly 100 and then to the first electronic part. As such, the first and second electronic parts may be connected by the wire 300 passing through the hinge assembly 100, which may prevent most of the wire 300 from being exposed to the outside and thus from harming the aesthetic appearance of the washing machine 1. Details of how the wire 300 passes through the hinge assembly 100 will be described later.

Figure 6:
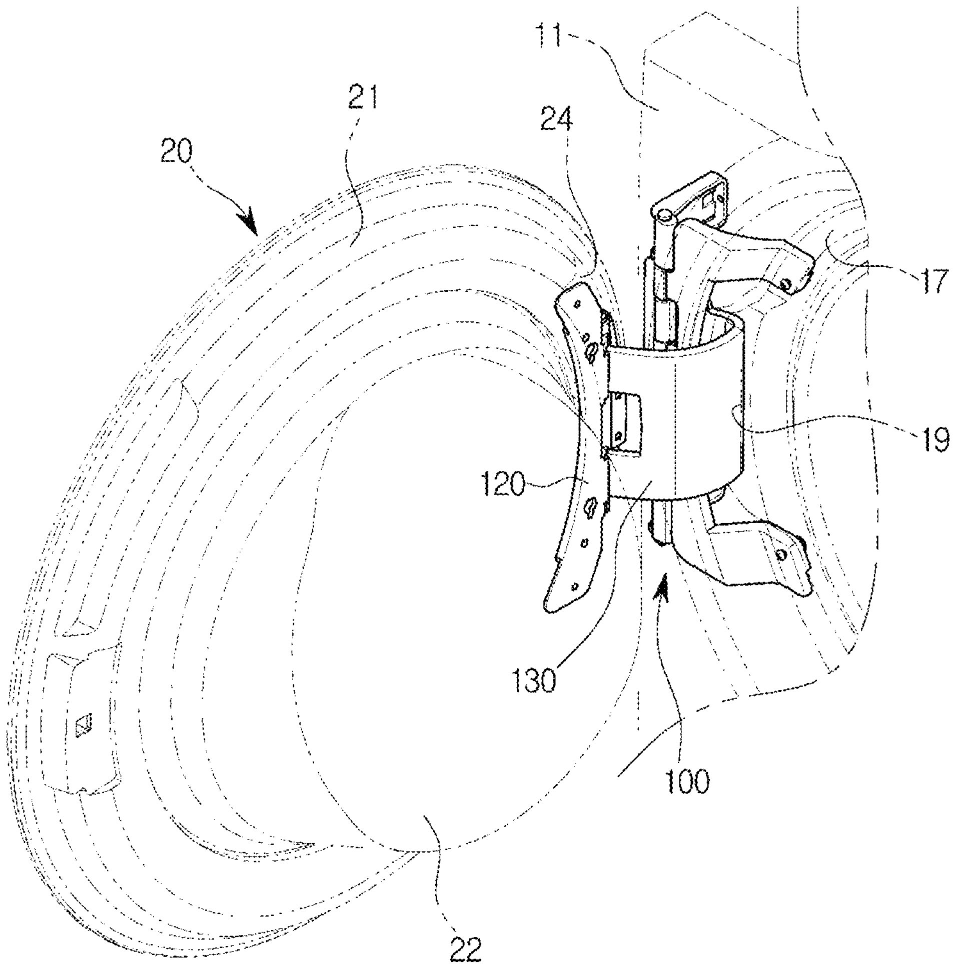
FIG. 6 shows a hinge assembly-coupled structure of a washing machine, according to an embodiment of the present disclosure.
Figure 7:
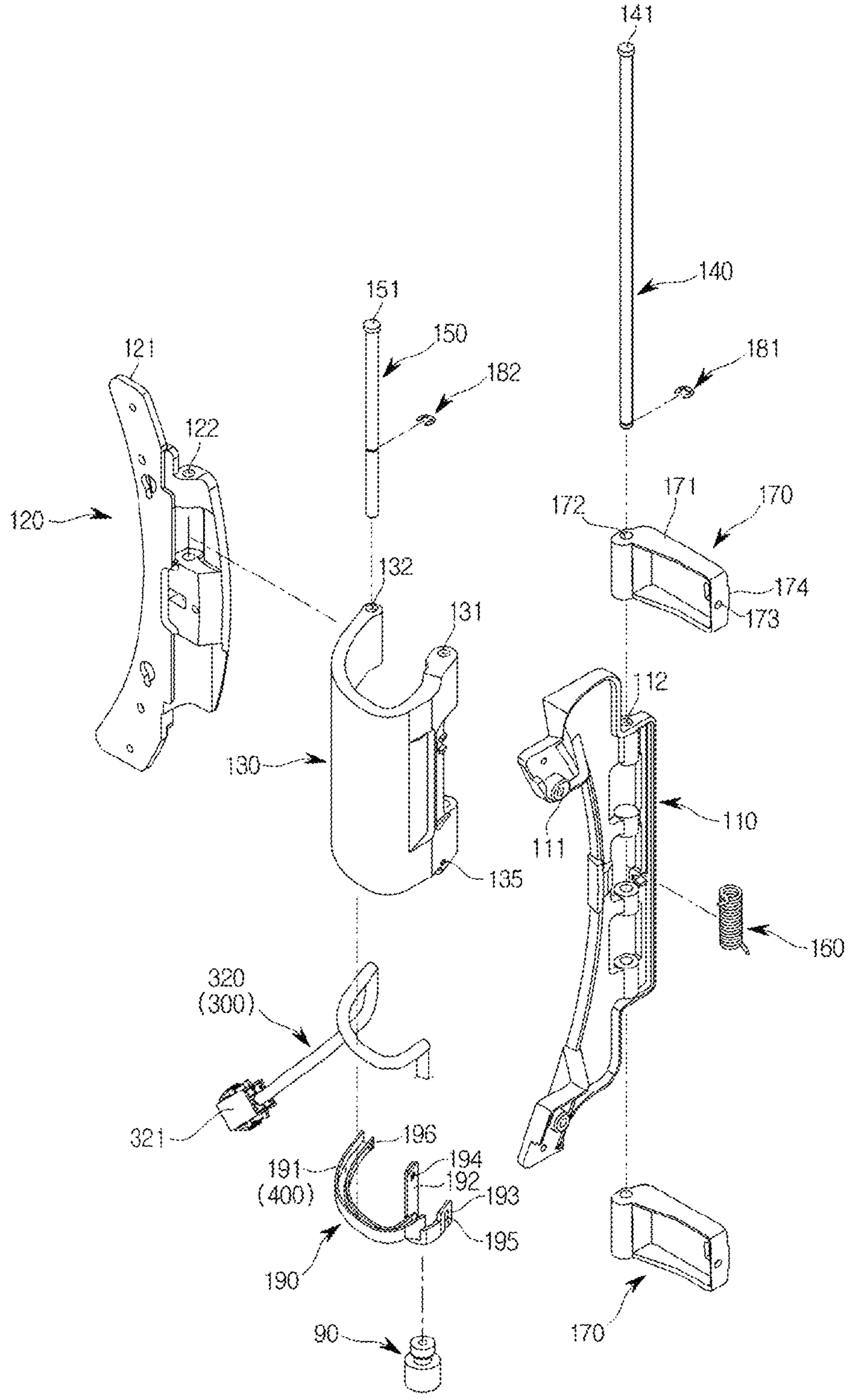
FIG. 7 is an exploded view of a hinge assembly of a washing machine, according to an embodiment of the present disclosure.
Figure 8:
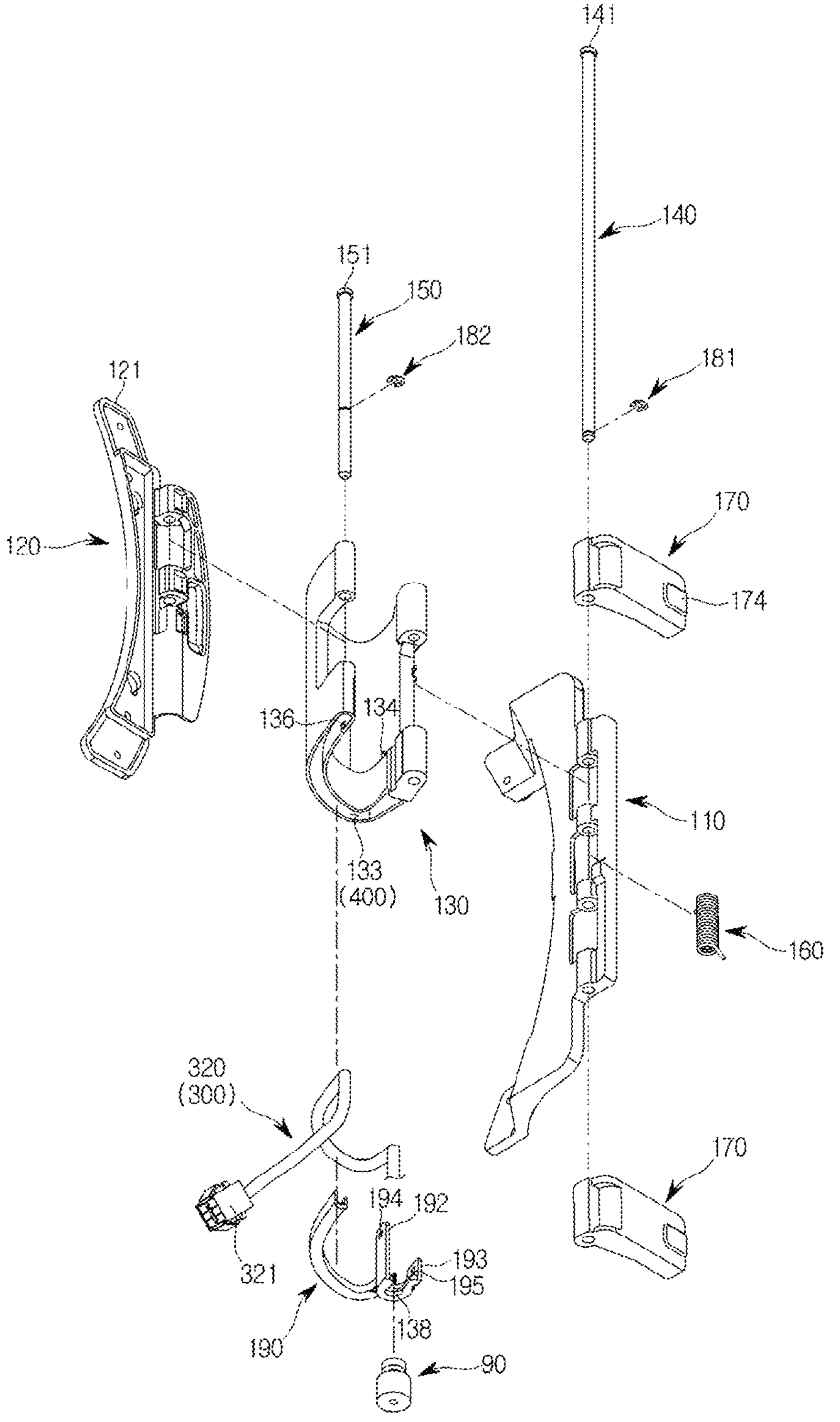
FIG. 8 is an exploded view of the hinge assembly of the washing machine angled differently from that of FIG. 7, according to an embodiment of the present disclosure.
Figure 9:
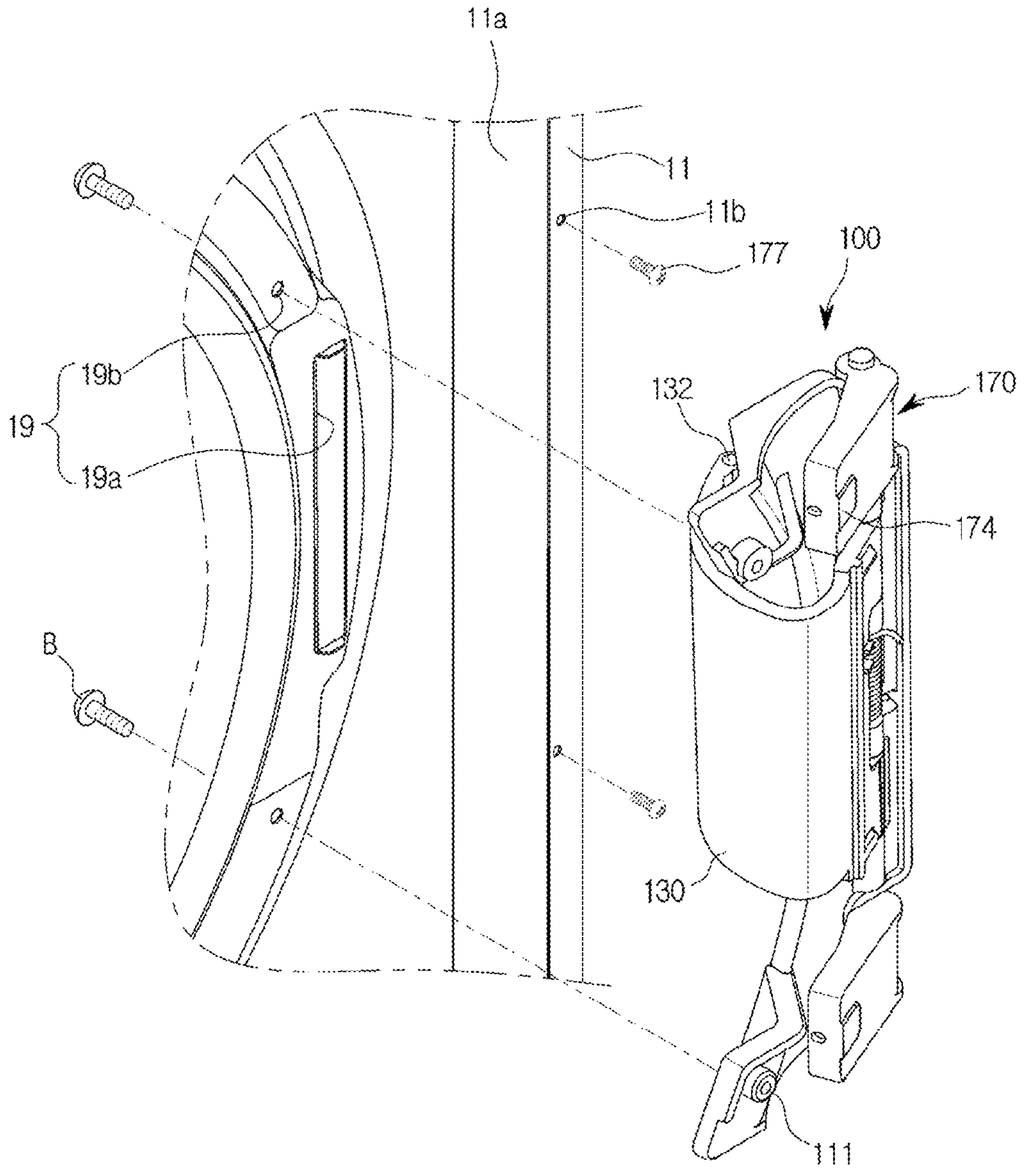
FIG. 9 shows a process of coupling a hinge assembly and a cabinet of a washing machine, according to an embodiment of the present disclosure.

FIG. 6 shows a hinge assembly-coupled structure of a washing machine, according to an embodiment of the present disclosure, and FIG. 7 is an exploded view of a hinge assembly of a washing machine, according to an embodiment of the present disclosure. FIG. 8 is an exploded view of the hinge assembly of the washing machine angled differently from that of FIG. 7, according to an embodiment of the present disclosure. FIG. 9 shows a process of coupling a hinge assembly and a cabinet of a washing machine, according to an embodiment of the present disclosure.

As shown in FIGS. 6 to 9, the hinge assembly 100 may include a first bracket 110, a second bracket 120, and a link unit 130.

The first bracket 110 may be combined with the cabinet 10. The second bracket 120 may be combined with the door 20. The link unit 130 may be pivotally coupled to each of the first bracket 110 and the second bracket 120. In other words, the link unit 130 may be arranged to connect the gap between the first bracket 110 and the second bracket 120, thus allowing the door 20 to pivot forward from the cabinet 10.

The first bracket 110 may be combined through the hinge assembly installation part 19 formed on the front frame 11 of the cabinet 10.

The hinge assembly installation part 19 may be arranged on one side of the door contact 17. The hinge assembly installation part 19 may include a first installation part 19*a* and a second installation part 19*b*. The first installation part 19*a* may be formed for the link unit 130 to penetrate. The second installation part 19*b* may be formed for the first bracket 110 to be coupled and fixed thereto.

It is preferable for the first installation part 19*a* to be formed in a size equal to or larger than the size of the link unit 130 in order for the link unit 130 to penetrate and pivot.

The second installation part 19*b* may be arranged for the first bracket 110 to be coupled with the front frame 11, and may be formed on each of the top side and the bottom side of the first installation part 19*a*. The second installation part 19*b* may have the form of a hole.

The first bracket 110 may include an assembly hole 111. A screw B passing through the second installation part 19*b* and the assembly hole 111 may fix the first bracket 110 to the front frame 11.

The first bracket 110 may further include a first shaft hole 112 coupled to the first shaft 140.

The second bracket 120 may include a door supporter 121. The second bracket 120 may support the door 20 by the door supporter 121 combined with the door frame 21.

The second bracket 120 may further include a second shaft hole 122. The second shaft 150 may be coupled to the second shaft hole 122 to pivotally support the door 20.

The link unit 130 may include a first coupling hole 131 and a second coupling hole 132. The first coupling hole 131 may be formed at one end of the link unit 130 for the first shaft 140 to be combined therewith. The second coupling hole 132 may be formed at another end of the link unit 130 for the second shaft 150 to be combined therewith. The one end of the link unit 130 may be connected with the first bracket 110 by the first shaft 140, and the other end of the link unit 130 may be connected with the second bracket 120 by the second shaft 150.

The link unit 130 may further include a wire guide 133. The wire guide 133 may be formed in the link unit 130 for the wire 300 to be arranged along at least a part of the link unit 130. In other words, the wire guide 133 may be concavely formed along a side of the link unit 130 for the wire 300 to be inserted thereto. Specifically, the wire guide 133 may be concavely formed along the bottom side of the link unit 130.

The link unit 130 may further include a link unit cover 190. The link unit cover 190 may be detachably combined with the link unit 130 for the wire 300 to be arranged between the link unit cover 190 and the link unit 130. That is, the link unit cover 190 may be detachably combined with the wire guide 133. The link unit cover 190 may play a role to prevent foreign materials from being brought into the wire guide 133. Furthermore, the link unit cover 190 may serve to prevent the wire 300 inserted to the wire guide 133 from being exposed to the outside. The link unit cover 190 may be detachably combined with the wire guide 133 to form a portion of the exterior of the link unit 130. As such, with the link unit cover 190 to be detachably combined with the wire guide 133, the link unit cover 190 may be removed in the process of inserting the wire 300 to the wire guide 133, thereby improving the working efficiency, and the link unit cover 190 may be coupled to the wire guide 133 once the wire 300 is inserted to the wire guide 133, thereby enabling the wire 300 to be stably received in the wire receiving space 400.

The link unit cover 190 may include a recessed part 191. The recessed part 191 may be formed on a side of the link unit cover 190. Specifically, the recessed part 191 may be formed on a side of the link unit cover 190 that faces the wire guide 133. The recessed part 191 may form a wire receiver to receive the wire 300 together with the wire guide 133 once the link unit cover 190 is coupled to the wire guide 133. The recessed part 191 may be continuously formed on a side of the link unit cover 190 that faces the wire guide 133 to correspond to the wire guide 133.

The link unit cover 190 may further include couplers 192, 193. The couplers 192, 193 may be formed at an end of the link unit cover 190. The couplers 192, 193 may be formed on the link unit cover 190 to extend upwards. The couplers 192,193 may include a first coupler 192 and a second coupler 193. The first and second couplers 192 and 193 may face each other with a wire outlet 138 between them. The extents to which the first and second couplers 192 and 193 extend upwards may differ. The first coupler 192 may face the inner wall of the link unit 130, and the second coupler 193 may face the outer wall of the link unit 130. When the hinge assembly 100 is installed between the door 20 and the cabinet 10, the outer wall of the link unit 130 may be directed to the inner side of the cabinet 10. From another perspective, the outer wall of the link unit 130 may face the opening 16 or the door glass 22. When the hinge assembly 100 is installed between the door 20 and the cabinet 10, the inner wall of the link unit 130 may be directed to the outer side of the cabinet 10. In the first coupler 192, there may be a first fixing hole 194 formed to be coupled with a first fixing protrusion 134 formed on the inner wall of the link unit 130. In the second coupler 193, there may be a second fixing hole 195 formed to be coupled with a second fixing protrusion 135 formed on the outer wall of the link unit 130. The link unit cover 190 may be combined with the link unit 130 to cover the wire guide 133 by the couplers 192,193. Firstly, the second fixing protrusion 135 of the link unit 130 is caught in the second fixing hole 195 of the second coupler 193, and secondly, the first fixing protrusion 134 of the link unit 130 is fit into the first fixing hole 194 of the first coupler 192.

The link unit cover 190 may further include a coupling protrusion 196. The coupling protrusion 196 enables the link unit cover 190 to be more stably combined with the link unit 130. The coupling protrusion 196 may be formed at another end of the link unit cover 190. The coupling protrusion 196 may be formed at another end of the link unit cover 190 near a wire inlet 137. The coupling protrusion 196 may be combined with the coupling hole 136 formed on the inner wall of the link unit 130. Specifically, the coupling protrusion 196 may be fit into the coupling hole 136.

The link unit cover 190 may be stably combined with the link unit 130 by the coupling between the coupling protrusion 196 and the coupling hole 136, the coupling between the first fixing protrusion 134 and the first fixing hole 194, and the coupling between the second fixing protrusion 135 and the second fixing hole 195.

The link unit 130 may further include the wire inlet 137. The wire inlet 137 may be formed to be adjacent to the second bracket 120 in order for the wire 300 passing through the through hole 23 to be brought into the wire guide 133, i.e., to be inserted to the wire guide 133. The link unit cover 190 may be combined with the wire guide 133 such that a portion of the wire guide 133 adjacent to the second bracket 120 is opened, and the wire inlet 137 may be formed in the opened portion of the wire guide 133.

The link unit 130 may further include the wire outlet 138. The wire outlet 138 may be formed on a side of the link unit cover 190 near the first bracket 110. The wire outlet 138 may be formed between the first coupler 192 and the second coupler 193. The wire 300 inserted to the wire guide 133 through the wire inlet 137 may be pulled out of the wire receiving space 400 through the wire outlet 138.

A second bracket installation part 24 may be formed on the door frame 21 of the door 20 for installation of the second bracket 120. Specifically, the second bracket installation part 24 may be formed on the back face of the door frame 21 facing the opening 16.

The hinge assembly 100 may further include a plurality of shafts 140,150. The plurality of shafts 140, 150 may include the first shaft connecting the first bracket 110 and one end of the link unit 130 and the second shaft 150 connecting the second bracket 120 and the other end of the link unit 130. The link unit 130 may further include the first coupling hole 131 coupled with the first shaft 140 and the second coupling hole 132 coupled with the second shaft 150.

The door 20 may pivot on the first shaft 140 and the second shaft 150.

The door 20 is able to open or close the opening 16 by pivoting forward and backward from the opening 16 by the link unit 130 that moves horizontally around the first shaft 140 of the hinge assembly 100.

The hinge assembly 100 may further include fixing rings 181, 182. The fixing rings 181, 182 may be coupled to at least one of the first shaft 140 and the second shaft 150 to prevent separation of the at least of the first shaft 140 and the second shaft 150. Preferably, the fixing rings 181, 182 may include the first fixing ring 181 coupled with the first shaft 140 and the second fixing ring 182 coupled with the second shaft 150.

The first fixing ring 181 may be coupled to a lower portion of the first shaft 140 to prevent separation of the first shaft 140 passing a shaft coupling hole 172 of a reinforcing member 170, the first shaft hole 112 of the first bracket 110, and the first coupling hole 131 of the link unit 130. Specifically, a stopper 141 formed in the upper portion of the first shaft 140 and the first fixing ring 181 coupled to a lower portion of the first shaft 140 may prevent the first shaft from being separated from the shaft coupling hole 172 of the reinforcing member 170, the first shaft hole 112 of the first bracket 110, and the first coupling hole 131 of the link unit 130.

The second fixing ring 182 may be coupled to a middle portion of the second shaft 150 to prevent separation of the second shaft 150 passing the second shaft hole 122 of the second bracket 120 and the second coupling hole 132 of the link unit 130. The second fixing ring 182 may be coupled to a middle portion of the second shaft 150 instead of a lower portion of the second shaft 150 to prevent the wire 300 inserted to the wire inlet 137 from being damaged by friction with the second fixing ring 182. A stopper 151 formed in the upper portion of the second shaft 150 and the second fixing ring 182 coupled to a middle portion of the second shaft 150 may prevent the second shaft 150 from being separated from the second shaft hole 122 of the second bracket 120 and the second coupling hole 132 of the link unit 130. A coupling position of the first fixing ring 181 for the first shaft 140 and a coupling position of the second fixing ring 182 for the second shaft 150 may not be limited to the above examples but may be variously changed.

The hinge assembly 100 may further include an elastic member 160. The elastic member 160 may be provided on the outer side of the first shaft 140 to enclose the first shaft 140. The elastic member 160 may be arranged to guide the motion of the link unit 130 by supporting the gap between the first shaft 140 and the link unit 130. The elastic member 160 may include a spring.

The hinge assembly 100 may further include the reinforcing member 170. The reinforcing member 170 may be arranged on the first shaft 140 to support the gap between the cabinet 10 and the hinge assembly 100.

The reinforcing member 170 is pivotally coupled to the first shaft 140 of the hinge assembly 100 at one end, and is supported and fixed by the rear face 11*a* of the cabinet 10.

The reinforcing member 170 may include a body 171, a first shaft through hole 23 formed at an end of the body 171 for the first shaft 140 to penetrate, and a fixing part 173 formed at the other end of the body 171 to be fixed to the cabinet 10.

A supporting rib 174 may be formed on the outside of the body 171 to make better contact with the rear face 11*a* of the cabinet 10. The supporting rib 174 may reinforce strength of the reinforcing member 170.

The fixing part 173 of the reinforcing member 170 may be formed at an end of the body 171, and may be fixed by a fixing member 177 such as a bolt passing through a fixing hole 11*b* formed on the front frame 11 of the cabinet 10.

Although an example of the fixing part 173 of the reinforcing member 170 fixed to the cabinet 10 by the fixing member 177 passing through the fixing hole 11*b* is illustrated, how to fix the fixing part 173 is not limited thereto. The fixing part 173 of the reinforcing member 170 may be fixed in a method such as screwing, riveting, soldering, cocking, thermosetting, etc.

The reinforcing member 170 may be provided in the top and bottom portions of the first shaft 140 as a pair. Separation and removal of the reinforcing member 170 may be prevented by the stopper 141 formed in an upper portion of the first shaft 140 and the first fixing ring 181 coupled in a lower portion of the first shaft 140.

The stopper 141 formed on the first shaft 140 may have a form that protrudes to the outer direction or to the radial direction of the first shaft 140, and the stopper 151 formed on the second shaft 150 may have a form that protrudes to the outer direction or to the radial direction of the second shaft 150.

The washing machine 1 may further include a protective member 90 coupled to at least one of the wire inlet 137 and the wire outlet 138 while enclosing the wire 300 to prevent snapping of the wire 300. The protective member 90 may have an elastic material. For example, the protective member 90 may be formed of at least one of rubber and silicon.

The washing machine 1 may further include the wire receiving space 400. The wire receiving space 400 may be provided between the cabinet 10 and the door 20 to receive at least a part of the wire 300. The wire receiving space 400 may be located in the hinge assembly 100. The recessed part 191 of the link unit cover 190 may form the wire receiving space 400 together with the wire guide 133.

Figure 10:
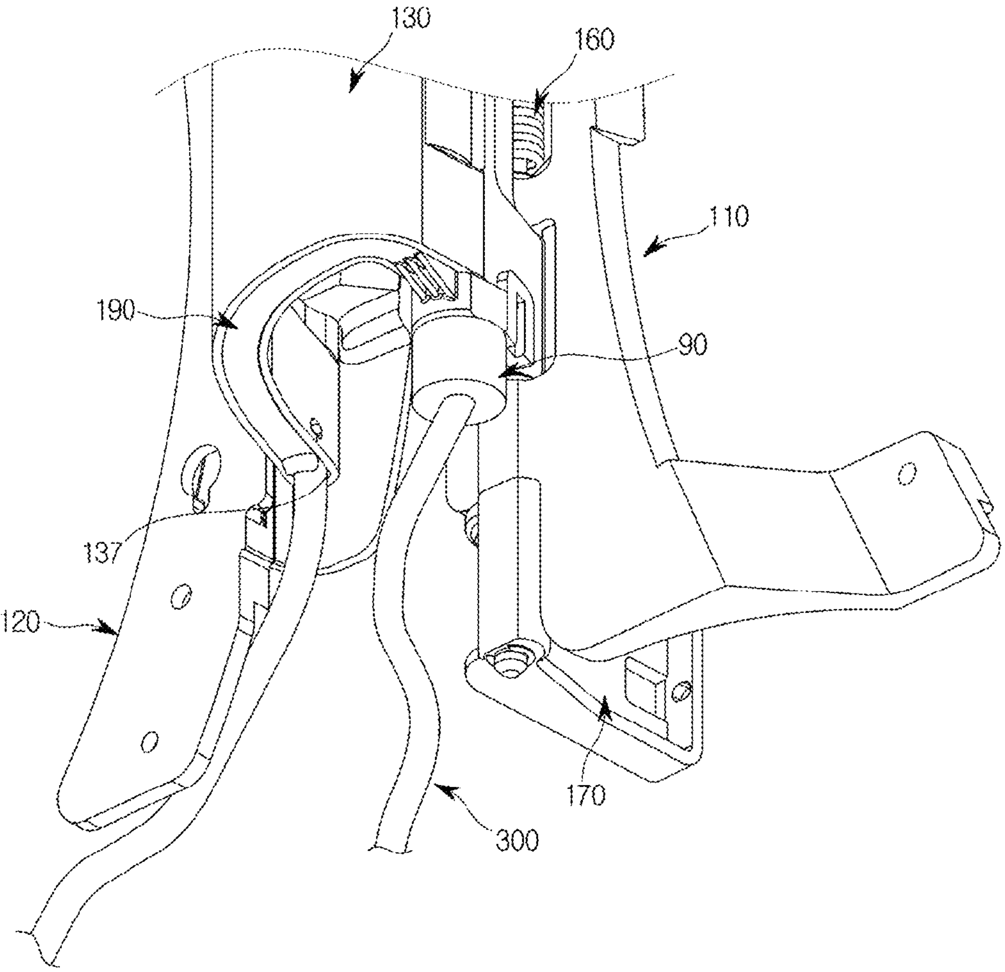
FIG. 10 shows wires inserted to a hinge assembly in a washing machine, according to an embodiment of the present disclosure.

FIG. 10 shows wires inserted to a hinge assembly in a washing machine, according to an embodiment of the present disclosure, and FIG. 11 shows wires passing a through hole of the door of a washing machine, according to an embodiment of the present disclosure. The first bracket 110 is omitted in FIG. 11.

As shown in FIGS. 10 and 11, the wire 300 may pass the hinge assembly 100 to connect the first and second electronic parts. The wire 300 may penetrate the link unit 130 to connect the first and second electronic parts.

The wire 300 connected to the second electronic part equipped in the door 20 at one end is inserted to the hinge assembly 100 after passing the through hole 23 formed on the rear side of the door 20. Specifically, the wire 300 passing the through hole 23 is connected to the first electronic part arranged in the cabinet 10 through the wire guide 133 formed in the link unit 130. The wire 300 inserted to the wire guide 133 through the wire inlet 137 is pulled out of the hinge assembly 100 through the wire outlet 138.

Figure 12:
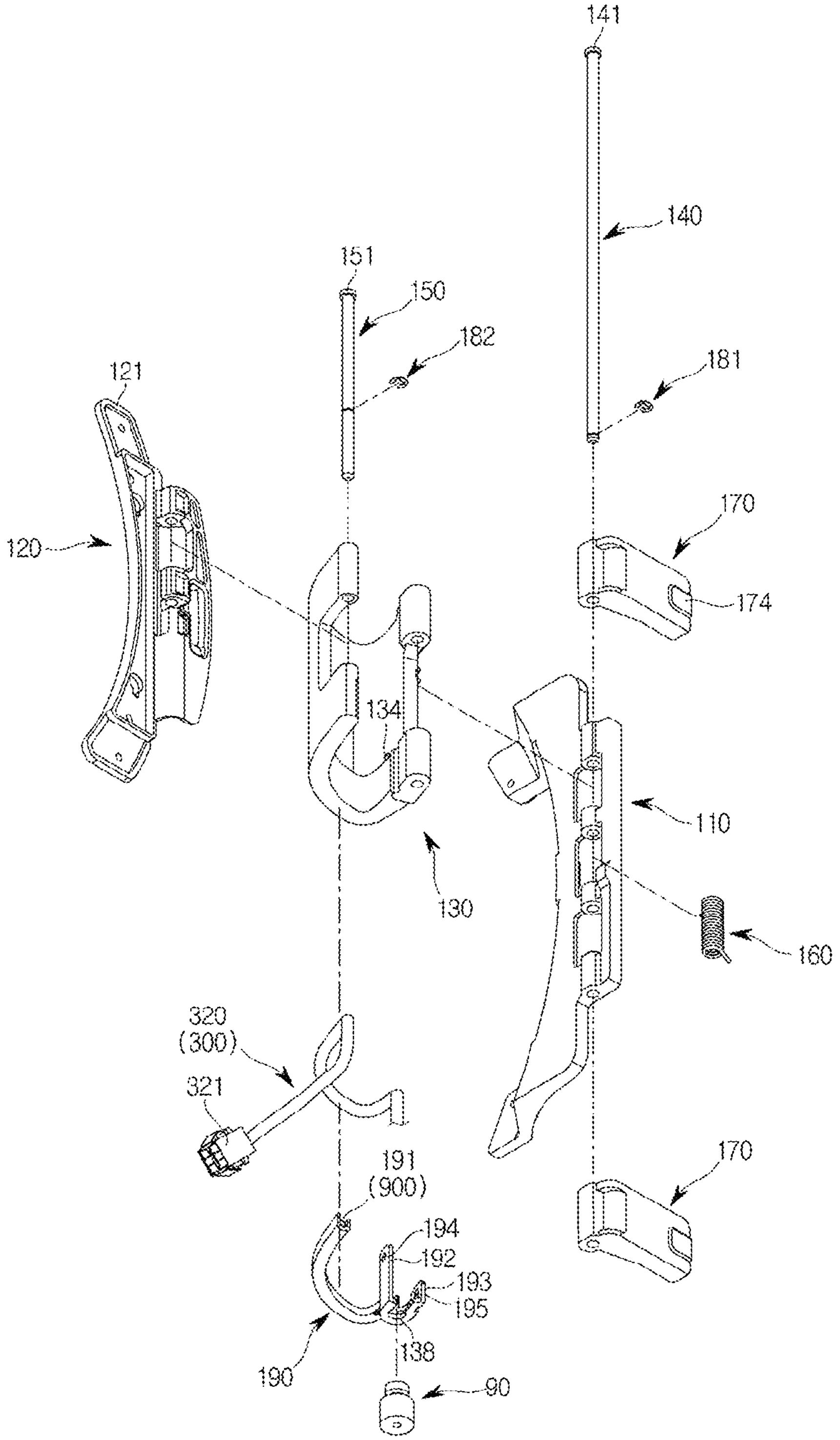
FIG. 12 is an exploded view of a hinge assembly of a washing machine, according to another embodiment of the present disclosure.

FIG. 12 is an exploded view of a hinge assembly of a washing machine, according to another embodiment of the present disclosure. What are overlapped with FIGS. 1 to 11 will be omitted in the following description.

As shown in FIG. 12, the wire 300 may be received between the link unit 130 and link unit cover 190. In other words, the wire 300 may be received in a wire receiving space 900. The recessed part 191 (see FIG. 7) of the link unit cover 190 may form the wire receiving space 900 together with one side, preferably, the bottom side of the link unit 130. The side of the link unit 130 forming the wire receiving space 900 with the recessed part 191 of the link unit cover 190 may be a flat plane. In other words, there is no recess such as the wire guide 133 (see FIG. 8) formed on the side of the link unit 130 that forms the wire receiving space 900 with the recessed part 191 of the link unit cover 190. In this case, the wire 300 received in the wire receiving space 900 may be settled in the recessed part 191 of the link unit cover 190.

While a case where the wire 300 passes the link unit 130 of the hinge assembly 100 in the process of connecting the second electronic part placed outside the cabinet 10 and the first electronic part placed inside the cabinet 10 is focused in the above description, it is also possible for the wire 300 to pass at least one element of the hinge assembly 100 to connect the first and second electronic parts.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A washing machine comprising:
- a cabinet equipped with a first electronic part therein and having an opening;
- a door equipped with a second electronic part therein and configured to open or close the opening;
- a hinge assembly comprising a link unit disposed between the cabinet and the door to allow the door to pivot relative to the cabinet;
- a link unit cover detachably coupled to the link unit;
- a wire configured to electrically connect the first electronic part and the second electronic part; and
- a protective member coupled to the link unit cover,
- wherein the link unit comprises a wire guide concavely formed in an end of the link unit in a direction parallel to a rotation axis of the door and a wire inlet formed in a side of the wire guide for the wire to be inserted into the wire guide,
- the link unit cover comprises a first portion that extends in a direction perpendicular to the rotation axis of the door to cover the wire guide and a second portion that protrudes in the direction parallel to the rotation axis of the door from a terminal end of the first portion to form a wire outlet through which the wire exits the wire guide and enters the protective member,
- at least a portion of the wire exits the wire guide in the direction parallel to the rotation axis of the door through the wire outlet, and
- the protective member is coupled to the wire outlet while enclosing the wire to prevent snapping of the wire.

2. The washing machine of claim 1, wherein the link unit cover forms a portion of an exterior of the link unit.

3. The washing machine of claim 1, wherein the link unit cover includes couplers formed at an end of the link unit cover to attach the link unit cover to the link unit.

4. The washing machine of claim 3, wherein the link unit cover is attached to the link unit by the couplers to cover the wire guide.

5. The washing machine of claim 3, wherein the couplers include a first coupler and a second coupler facing each other.

6. The washing machine of claim 5, wherein the first coupler includes a first fixing hole formed to be coupled with an inner wall of the link unit.

7. The washing machine of claim 6, wherein the second coupler includes a second fixing hole formed to be coupled with an outer wall of the link unit.

8. The washing machine of claim 1, wherein:
- the hinge assembly comprises a first bracket coupled to the cabinet and a second bracket coupled to the door, and
- the link unit is configured to pivotally connect the first bracket and the second bracket.

* * * * *